Patented May 30, 1933

1,911,315

UNITED STATES PATENT OFFICE

CARL HANER, OF MOYLAN, AND EDWARD P. FENIMORE, OF DREXEL HILL, PENNSYLVANIA, ASSIGNORS TO PUBLICKER, INC., OF PHILADELPHIA, PENNSYLVANIA, A CORPORATION OF DELAWARE

PROCESS FOR THE MANUFACTURE OF ACETIC ACID

No Drawing.  Application filed August 19, 1931. Serial No. 558,188.

Our invention relates to a process of preparing acetic acid from ethyl alcohol or mixtures of ethyl alcohol and acetaldehyde, and more particularly it relates to a process by which acetic acid can be produced by means of a single catalyst by the oxidation of ethyl alcohol or mixtures of ethyl alcohol and acetaldehyde to acetic acid in the presence of oxygen, either in pure form or as air.

One object of our invention is to provide a process by which substantial yields of acetic acid may be obtained by the oxidation of ethyl alcohol or mixtures of ethyl alcohol and acetaldehyde in the presence of oxygen by passing the alcohol vapor or the mixture containing acetaldehyde vapors over a heated catalyst.

A further object of our invention is to provide a process for the production of very good yields of acetic acid from ethyl alcohol or mixtures or ethyl alcohol and acetaldehyde, which process is characterized by the use of a catalyst which is reactivated during the process and which, therefore, can be employed in the system for the production of acetic acid without removal therefrom for the purposes of reactivation.

A further object of our invention is to furnish a process for the catalytic production of acetic acid from ethyl alcohol and mixtures thereof with acetaldehyde which, due to the reactivation of the catalyst during the process, may be run continuously, any unoxidized alcohol or aldehyde passing through the catalytic chamber being recirculated and hence utilized in the production of acetic acid.

Still another object of our invention is to provide a novel catalyst for the production of acetic acid, and the method of preparing it, which catalyst is capable of producing large yields of acetic acid from ethyl alcohol or mixtures of ethyl alcohol and acetaldehyde in the presence of oxygen, and is capable of reactivation by the oxygen during the process.

These and other objects will be apparent hereinafter from a consideration of the specification and claims.

It is well known that ethyl alcohol vapor can be oxidized to acetaldehyde by passing it together with oxygen over a catalyst such as copper or silver. Difficulty has been encountered, however, in continuing the oxidation of the alcohol to acetic acid since in these methods, there is produced a large amount of acetaldehyde together with certain undesirable by-products such as acetal, methane, ester, and the like, and with but a very small amount of acetic acid. It has not, heretofore, been possible to get a substantial yield of acetic acid by the oxidation of ethyl alcohol in the presence of air or pure oxygen by continuously passing the vapor over a catalyst; nor has it been possible to pass a mixture of alcohol and acetaldehyde continuously over a catalyst and convert both to acetic acid in substantial amounts.

The present invention contemplates a process for manufacturing acetic acid, resulting in very good yields of acid and with but few by-products, by passing ethyl alcohol vapor or a mixture of ethyl alcohol and acetaldehyde vapor over a specially prepared non-luminous copper oxide catalyst in the presence of oxygen either in the form of air or in pure form, the catalyst being maintained during the process at a temperature varying from approximately 300° C. to 400° C., and preferably in the neighborhood of 320° C.–340° C. The invention further contemplates a process for the production of acetic acid catalytically in which the catalyst can be used continuously without independent treatment to reactivate it, due to the fact that the oxygen during the process acts upon it and keeps it in an active condition.

The catalyst which is employed in the present invention is activated copper oxide in any suitable form such as mill scale, copper oxide wire, copper oxide gauze, etc. Prior to its use in the process of the present invention, it is treated to render its suitably active for the purpose. The activation is accomplished by treating the heated copper oxide with alcohol vapor preferably in the absence of air. At first the proportion of alcohol changed into acetic acid is very low, but this increases as the passage of alcohol vapor is increased until a maximum proportion is obtained, thereafter the proportion of alcohol converted begins to decrease. The treatment of the catalyst is stopped at or or near that point where the production of acetic acid is at the maximum.

In a typical case, 7 pounds 7 ounces of copper oxide are placed in a tube making a column of catalyst thirty-eight inches long. Alcohol vapor is passed through the column of catalyst which is maintained at 300° C. to 340° C. at the rate of 70 grams of 95% alcohol per hour. In this case, it is found that the formation of acetic acid is at its peak when 262 grams of 95% alcohol have been passed through the column. It will be understood that the rate of passage of alcohol, the amount of alcohol necessary and the temperature of the catalyst may all be varied to suit the particular conditions existing.

In carrying out the process for the manufacture of the acetic acid, the catalyst is placed in a catalytic chamber which is maintained between 300° C. and 400° C. and preferably in the neighborhood of 320° C.–340° C. The ethyl alcohol vapor, or the mixture of ethyl alcohol vapor and acetaldehyde, and air or pure oxygen are preferably preheated to a temperature approximating that of the chamber in order not to chill the catalyst and make it less active, although this preheating step is not necessary if the operator deems it inexpedient. The amount of oxygen employed is such that there will be sufficient present in the catalytic chamber not only to furnish oxygen for the oxidation of at least a portion of the alcohol and acetaldehyde but also for maintaining the catalyst active. For the purpose of obtaining the best yield, it has been found advantageous to use such a proportion of oxygen that practically all of it will be utilized in the catalytic chamber. It has also been found that the addition of water vapor or the use of alcohol of less strength than 95% will give substantially higher yields of acetic acid than are obtained when water-free alcohol or 95% alcohol is used.

It has been found advantageous to pass the air or pure oxygen through the alcohol in a vaporizer maintained at a proper temperature to give the ratio of alcohol of oxygen desired. The vaporizer may also contain acetaldehyde in which case the vapor laden air or oxygen contains both alcohol and acetaldehyde. This vapor laden air is then passed through a tube charged with the activated copper oxide catalyst. The tube which may be of metal such as iron or copper is maintained at the desired temperature by any suitable means, for example, by placing it in a liquid which is maintained at the temperature desired by external means. The products issuing from the tube are for the most part water and acetic acid vapors containing some acetaldehyde and a little unconverted alcohol. The vapors are condensed or absorbed by suitable means and the alcohol and acetaldehyde are distilled from the mixture and utilized in the process. If a continuous process is desired, the products issuing from the catalytic chamber or tube are condensed at a temperature below the boiling point of acetic acid and above the boiling point of the ethyl alcohol and acetaldehyde, in which case substantially all of the acetic acid is retained in the first condenser while the alcohol and aldehyde for the most part pass on and are condensed or absorbed in subsequent apparatus and are continuously added to the alcohol delivered to the catalytic chamber or tube. Obviously, if acetaldehyde is desired as a by-product, ethyl alcohol alone and the air or pure oxygen are passed through the catalyst, and the acetic acid and acetaldehyde formed are recovered as finished products.

In a typical case, 7 pounds 7 ounces of copper oxide activated as herein described are placed in a tube, making a column of catalyst thirty-eight inches long. 109.2 liters of air are passed through ethyl alcohol of 95% strength at 46° C. at such a rate that the air is approximately saturated with alcohol vapor. Water vapor substantially equalling the alcohol vapor in weight is then added to the alcohol vapor-laden air. This mixture is passed through the activated copper oxide catalyst maintained at an approximately constant temperature in a bath of liquid sodium and potassium nitrate, the bath temperature being kept at approximately 325° C. by external means. The rate of passage of the mixed gases is such that 67.6 grams of 95% alcohol per hour are passed through the tube. From 47.4 grams of 95% alcohol, there are obtained 26.27 grams of acetic acid and 13.57 grams of acetaldehyde. A little unchanged alcohol is also recovered. The acetaldehyde, unless it is desired as a finished product, together with the unconverted alcohol is mixed with the alcohol fed to the catalytic chamber.

In a typical case where both ethyl alcohol and acetaldehyde are fed to the catalyst, 110.4 liters of free air are passed through ethyl alcohol of 95% strength containing acetaldehyde kept at a temperature of 42° C.–43° C. at such a rate that the air is substantially saturated with alcohol and aldehyde vapor. Water vapor substantially equalling the combined amount of ethyl alcohol and acetaldehyde is then added to the vapor-laden air. This mixture is passed through the activated copper oxide catalyst arranged in a metal tube so that 7 pounds 7 ounces make a column of catalyst thirty-eight inches long. During the passage of the vapor-laden air, the catalytic chamber or tube is maintained at the desired temperature by placing it in a bath of a liquid mixture of sodium and potassium nitrates heated externally to a temperature of 325° C.–327° C. The rate of passage of the mixed gases is such that a total of 60 to 70 grams of alcohol and acetaldehyde are passed through the tube per hour. From 31.6 grams of 95% alcohol and 15 grams of acetaldehyde, there are obtained 23.36 grams of acetic acid and 15.33 grams of acetaldehyde with a small amount of unchanged alcohol. The acetaldehyde and alcohol are continuously separated from the acetic acid as hereinbefore described and are continuously added to the supply of ethyl alcohol passed through the catalytic tube or chamber.

In both examples, the catalyst is of such a nature that it is reactivated during the process by the oxygen passed through it, thus a process is provided in which the catalyst can be used continuously without the necessity of its removal and reactivation by a separate process. The amount of air or oxygen to alcohol and aldehyde given in the preceding examples may be varied widely, care being taken, however, to avoid the formation of explosive mixtures. It is to be noted that herein in both the specification and claims the word "oxygen" includes both air and oxygen in pure form. Furthermore, the strength of the ethyl alcohol employed as well as the amount of water vapor added may be varied within considerable limits, pure 95% alcohol or pure 95% alcohol and acetaldehyde being employed if desired. In most instances, it is found that some water vapor is desirable, and it will be obvious that the amount employed determines the concentration of the acetic acid solution obtained. The acetaldehyde and/or water may be added to the alcohol before vaporization and the whole mixture vaporized by the air in one process, or the acetaldehyde may be added to the water and the mixture vaporized separately and mixed with the alcohol in air mixture. It will thus be seen that the specific steps employed in the process are capable of wide variation without departing from the essential features of our invention.

We claim:

1. The process of preparing acetic acid catalytically which comprises passing a vapor, containing essentially as an active ingredient a compound capable of catalytic oxidation to form acetic acid, an oxygen through a catalytic chamber maintained at a temperature between 300° C. and 400° C. in contact with a catalyst of non-luminous copper oxide, said catalyst having been activated by treating copper oxide with ethyl alcohol vapors at an elevated temperature until the production of acetic acid is at or near the maximum, and thereafter condensing the vapors to obtain the acetic acid.

2. The process of preparing acetic acid catalytically which comprises passing a vapor, containing essentially as an active ingredient a compound capable of catalytic oxidation to form acetic acid, and oxygen through a catalytic chamber maintained at a temperature between 300° C. and 400° C. in contact with a catalyst of non-luminous copper oxide, said catalyst having been activated by treating copper oxide with ethyl alcohol vapors in the absence of oxygen at an elevated temperature until the production of acetic acid is at or near the maximum, and thereafter condensing the vapors to obtain the acetic acid.

3. The process of preparing acetic acid catalytically which comprises passing a vapor, containing essentially as an active ingredient a compound capable of catalytic oxidation to form acetic acid, and oxygen through a catalytic chamber maintained at a temperature in the neighborhood of 320° C.–340° C. in contact with a catalyst of non-luminous copper oxide, said catalyst having been activated by treating copper oxide with ethyl alcohol vapors at an elevated temperature until the production of acetic acid is at or near the maximum, and thereafter condensing the vapors to obtain the acetic acid.

4. The process of preparing acetic acid catalytically which comprises passing a vapor, containing essentially as an active ingredient a compound capable of catalytic oxidation to form acetic acid, and oxygen through a catalytic chamber maintained at a temperature between 300° C. and 400° C. in contact with a catalyst of non-luminous copper oxide, said catalyst having been activated by treating copper oxide with ethyl alcohol vapors in the absence of oxygen at a temperature in the neighborhood of 300° C.–340° C. until the production of acetic acid is at or near the maximum, and thereafter condensing the vapors to obtain the acetic acid.

5. The process of preparing acetic acid catalytically which comprises passing a vapor, containing essentially as an active ingredient a compound capable of catalytic oxidation to form acetic acid, and oxygen through a catalytic chamber maintained at a temperature in the neighborhood of 320° C.–340° C. in contact with a catalyst of non-luminous copper oxide, said catalyst having been activated by treating copper oxide with ethyl alcohol vapors in the absence of oxygen at a temperature in the neighborhood of 300° C.–340° C. until the production of acetic acid is at or near the maximum, and thereafter condensing the vapors to obtain the acetic acid.

6. The process of claim 1 in which water vapor is passed through the catalytic chamber with the oxygen and vapor containing essentially as an active ingredient a compound capable of oxidation to form acetic acid.

7. The process of claim 2 in which water vapor is passed through the catalytic chamber with the oxygen and vapor containing essentially as an active ingredient a compound capable of oxidation to form acetic acid.

8. The process of claim 4 in which water vapor is passed through the catalytic chamber with the oxygen and vapor containing essentially as an active ingredient a compound capable of oxidation to form acetic acid.

9. The process of claim 5 in which water vapor is passed through the catalytic chamber with the oxygen and vapor containing essentially as an active ingredient a compound capable of oxidation to form acetic acid.

10. The process of preparing acetic acid catalytically which comprises passing a vapor, containing essentially as an active ingredient a compound capable of catalytic oxidation to form acetic acid, and oxygen through a catalytic chamber maintained at a temperature between 300° C. and 400° C. in contact with the catalyst of non-luminous copper oxide, said catalyst having been activated by treating copper oxide with ethyl alcohol vapors at an elevated temperature until the production of acetic acid is at or near the maximum, condensing the vapors, separating the acetic acid from the unoxidized compounds, and continuously returning said unoxidized compounds to the system to be re-vaporized and re-passed through the catalyst.

11. The process of preparing acetic acid catalytically which comprises passing a vapor, containing essentially as an active ingredient a compound capable of catalytic oxidation to form acetic acid, and oxygen through a catalytic chamber maintained at a temperature in the neighborhood of 320° C.–340° C. in contact with a catalyst of non-luminous copper oxide, said catalyst having been activated by treating copper oxide with ethyl alcohol vapors in the absence of oxygen at an elevated temperature until the production of acetic acid is at or near the maximum, condensing the vapors, separating the acetic acid from the unoxidized compounds, and continuously returning said unoxidized compounds to the system to be re-vaporized and re-passed through the catalyst.

12. The process of preparing acetic acid catalytically which comprises passing a vapor, containing essentially as an active ingredient a compound capable of catalytic oxidation to form acetic acid, and oxygen through a catalytic chamber maintained at a temperature in the neighborhood of 320° C.–330° C. in contact with a catalyst of non-luminous copper oxide, said catalyst having been activated by treating copper oxide with ethyl alcohol vapors in the absence of oxygen at a temperature in the neighborhood of 300° C.–340° C. until the production of acetic acid is at or near the maximum, condensing the vapors, separating the acetic acid from the unoxidized compounds, and continuously returning said unoxidized compounds to the system to be re-vaporized and re-passed through the catalyst.

13. The process of claim 10 in which water vapor is passed through the catalytic chamber with the oxygen and vapor containing essentially as an active ingredient a compound capable of oxidation to form acetic acid.

14. The process of preparing acetic acid catalytically which comprises passing a vapor containing essentially as an active ingredient a compound capable of catalytic oxidation to form acetic acid and oxygen through a catalytic chamber maintained at a temperature between 300° C. and 400° C. in contact with a catalyst of non-luminous copper oxide, said catalyst having been activated by treating copper oxide with ethyl alcohol vapors at an elevated temperature until the production of acetic acid is at or near the maximum, the amount of oxygen passed through the system being sufficient in amount to cause oxidation of at least a portion of the initial ingredients and to maintain the catalyst in an active condition, to obtain the acetic acid.

15. The process of preparing acetic acid catalytically which comprises passing a vapor containing essentially as an active ingredient a compound capable of catalytic oxidation to form acetic acid and oxygen through a catalytic chamber maintained at a temperature in the neighborhood of 320° C.–340° C. in contact with a catalyst of non-luminous copper oxide, said catalyst having been activated by treating copper oxide with ethyl alcohol vapors at an elevated temperature until the production of acetic acid is at or near the maximum, the amount of oxygen passed through the system being sufficient in amount to cause oxidation of at least a portion of the initial ingredients and to maintain the catalyst in an active condition, and thereafter condensing the vapors to obtain the acetic acid.

16. The process of claim 14 in which water vapor is passed through the catalytic chamber with the oxygen and vapor containing essentially as an active ingredient a compound capable of oxidation to form acetic acid.

17. The process of claim 15 in which water vapor is passed through the catalytic chamber with the oxygen and vapor containing essentially as an active ingredient a compound capable of oxidation to form acetic acid.

CARL HANER.
EDWARD P. FENIMORE.